US012779589B2

(12) United States Patent
Bougrov et al.

(10) Patent No.: US 12,779,589 B2
(45) Date of Patent: Nov. 3, 2026

(54) METHOD FOR MANUFACTURING AN OPTICAL COUPLING ARRANGEMENT

(71) Applicant: Innolume GmbH, Dortmund (DE)

(72) Inventors: Vladislav Bougrov, Dortmund (DE); Sergey Mikhrin, Dortmund (DE); Alexey Kovsh, Dortmund (DE); Alexey Gubenko, Dortmund (DE)

(73) Assignee: INNOLUME GMBH, Dortmund (DE)

( * ) Notice: Subject to any disclaimer, the term of this patent is extended or adjusted under 35 U.S.C. 154(b) by 758 days.

(21) Appl. No.: 18/318,429

(22) Filed: May 16, 2023

(65) Prior Publication Data

US 2024/0383075 A1 Nov. 21, 2024

(51) Int. Cl.

| | |
|---|---|
| ***B23K 26/36*** | (2014.01) |
| ***B23K 26/067*** | (2006.01) |
| ***B23K 26/362*** | (2014.01) |
| ***G02B 27/00*** | (2006.01) |
| *G02B 6/42* | (2006.01) |

(52) U.S. Cl.

CPC .......... *B23K 26/362* (2013.01); *B23K 26/067* (2013.01); *G02B 27/0012* (2013.01); *G02B 6/4206* (2013.01)

(58) Field of Classification Search

CPC ......................... G02B 6/4206; G02B 27/0012; B23K 26/362; B23K 26/067

USPC ............................................................ 385/15

See application file for complete search history.

(56) References Cited

U.S. PATENT DOCUMENTS

| | | | |
|---|---|---|---|
| 6,154,593 | A | 11/2000 | Miura et al. |
| 6,438,295 | B1 | 8/2002 | McGarry et al. |
| 9,034,222 | B2 | 5/2015 | Koos et al. |
| 9,124,959 | B2 | 9/2015 | Xu et al. |
| 9,529,154 | B2 | 12/2016 | Van Steenberge et al. |
| 9,594,220 | B1 | 3/2017 | Sutherland |
| 10,162,112 | B2 | 12/2018 | Sutherland |
| 10,422,967 | B2 | 9/2019 | Zhao et al. |
| 10,459,160 | B2 | 10/2019 | Brusberg |
| 10,684,419 | B2 | 6/2020 | Fortusini et al. |
| 10,948,658 | B2 | 3/2021 | Florian Lohse et al. |

(Continued)

FOREIGN PATENT DOCUMENTS

WO 2020116146 A1 6/2020

OTHER PUBLICATIONS

ISA European Patent Office, International Search Report Issued in Application No. PCT/EP2024/063465, Sep. 6, 2024, WIPO, 5 pages.

(Continued)

*Primary Examiner* — Jerry M Blevins

(74) *Attorney, Agent, or Firm* — McCoy Russell LLP

(57) ABSTRACT

In a method for manufacturing an optical coupling arrangement, first and second optical components having transmitting and receiving facets, respectively, are positioned with the facet facing each other. A glass coupler preform body with a converging element is positioned between the optical components, the converging element facing the transmitting facet configured to transmit a light beam. A coupling waveguide is designed, taking into account positioning misalignments, to transmit light between the converging member and a transmitting facet, and at least part of the designed coupling waveguide is formed in the coupler preform body.

20 Claims, 5 Drawing Sheets

(56) References Cited

U.S. PATENT DOCUMENTS

| | | | | |
|---|---|---|---|---|
| 2002/0076655 | A1 | 6/2002 | Borrelli et al. | |
| 2007/0237453 | A1* | 10/2007 | Nielsen | G02B 6/262 385/28 |
| 2014/0334768 | A1 | 11/2014 | Chang et al. | |
| 2017/0153392 | A1 | 6/2017 | Murray et al. | |
| 2018/0017748 | A1 | 1/2018 | Mir Shafiei et al. | |
| 2019/0154931 | A1* | 5/2019 | Masters | G02B 6/13 |
| 2019/0258175 | A1* | 8/2019 | Dietrich | G02B 6/305 |
| 2019/0369341 | A1 | 12/2019 | Shaw et al. | |
| 2021/0305541 | A1* | 9/2021 | Ahn | G02B 30/29 |
| 2022/0373742 | A1* | 11/2022 | Kim | G02B 6/30 |

OTHER PUBLICATIONS

ISA European Patent Office, Written Opinion of the International Searching Authority Issued in Application No. PCT/EP2024/063465, Sep. 6, 2024, WIPO, 7 pages.

* cited by examiner

METHOD FOR MANUFACTURING AN OPTICAL COUPLING ARRANGEMENT

BACKGROUND

In data communication, optical data communication technology may provide excellent performance, for example, from data transfer speed, space-efficiency, energy-efficiency, and/or cost-efficiency points of view.

An important factor affecting the feasibility of optical data communication and transfer systems is the efficiency of optical coupling between different optical components in various devices such as optical transceivers. Optical coupling is in crucial role both in transmitting and receiving stages of optical data communication systems. This is the case especially in the case of active optical components or elements such as ones comprising semiconductor lasers or arrays of the same, wherein light transmitted by such active optical components or elements is to be coupled into other optical components or elements. Differences in optical properties of transmitting and receiving optical components, such as numerical apertures or mode field or beam shapes or sizes, may easily result in significant coupling losses. In addition, even with the two optical components having similar optical properties, inaccuracies in aligning opposite optical components may decrease the coupling efficiency. On the other hand, as the requirements of the aligning accuracy increase, the manufacturing processes of optical coupling arrangements may become less efficient and slower.

In addition to data communication applications, corresponding challenges related to optical coupling may be present in other applications such as in optical sensing.

Improved solutions are needed where high efficiency optical coupling arrangements can be manufactured effectively.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for manufacturing an optical coupling arrangement is disclosed, the method comprising: providing a first optical component having a transmitting facet, configured to transmit a light beam with a beam divergence corresponding to a first numerical aperture out of the transmitting facet; providing a second optical component with a second numerical aperture, having a receiving facet, configured to receive light via the receiving facet; providing a glass coupler preform body having a receiving side surface, an opposite transmitting side surface, and comprising a converging member configured to reduce, in accordance with converging characteristics, the beam divergence of the light beam entering the glass coupler preform body via the receiving side surface; positioning the first and second optical components with the transmitting and receiving facets facing each other mutually misaligned by an optical component misalignment; positioning the coupler preform body between the first and the second optical components with the converging member and the transmitting facet facing each other mutually misaligned by a preform misalignment; determining the optical component and preform misalignments; designing, on the basis of the determined misalignments, the first numerical aperture, and/or the converging characteristics, a coupling waveguide between the converging member and an output facet on the transmitting side surface facing and aligned with the receiving facet; and forming at least part of the designed coupling waveguide in the coupler preform body by direct laser writing. The second numerical aperture may be smaller than the first numerical aperture.

In an embodiment the coupling waveguide is designed so as to have an input numerical aperture at the input facet smaller than the first numerical aperture.

In an embodiment which may be in accordance with the previous embodiment, the coupling waveguide is designed so as to have an output numerical aperture at the output facet smaller than or equal to the second numerical aperture.

In an embodiment which may be in accordance with any of the previous embodiments, the converging member comprises a lens. The lens may comprise an elliptical cylindrical lens.

In an embodiment which may be in accordance with any of the previous embodiments, the converging member forms a local extension outwards of the receiving side surface.

In an embodiment which may be in accordance with any of the previous embodiments, the converging member is formed within the coupler preform body.

In an embodiment in accordance with the previous embodiment, the providing the coupler preform body comprises forming the converging member in the coupler preform body by direct laser writing.

In an embodiment which may be in accordance with any of the previous embodiments, the optical component and preform misalignments are determined using a machine vision system.

In an embodiment which may be in accordance with any of the previous embodiments, the first numerical aperture is at least 0.2, for example, at least 0.3.

In an embodiment which may be in accordance with any of the previous embodiments, the second numerical aperture is less than or equal to 0.10.

In an embodiment which may be in accordance with any of the previous embodiments, the coupling waveguide is designed so as to narrow towards the output facet.

In an embodiment which may be in accordance with any of the previous embodiments, the coupling waveguide is designed so as to have at least one curved section.

In an embodiment which may be in accordance with any of the previous embodiments, the coupling waveguide is designed so as to have at least one curved section narrowing towards the output facet.

In an embodiment which may be in accordance with any of the previous embodiments, the coupling waveguide is designed so as to have a first end at the side of the receiving side surface and a first facet at the first end, the first facet lying at a non-zero angle relative to the receiving side surface.

In an embodiment which may be in accordance with any of the previous embodiments, the coupler preform body is provided so as to comprise a prefabricated waveguide section, and the coupling waveguide is designed so as to comprise the prefabricated waveguide section.

In an embodiment which may be in accordance with any of the previous embodiments, the coupling waveguide is designed so as to adjust a mode field shape of light propagating therein.

In an embodiment which may be in accordance with any of the previous embodiments, the coupling waveguide is designed so as to rotate polarization of light propagating therein.

In an embodiment which may be in accordance with any of the previous embodiments, the coupling waveguide is designed so as to have a first end at the side of the receiving side surface and a second end at the side of the transmitting side surface, at least one of the first and the second ends lying at a separation distance from the transmitting or face, respectively. The separation distance may lie in the range of 2 to 25 μm.

In an embodiment which may be in accordance with any of the previous embodiments, the first optical component comprises an active optical component, such as a semiconductor laser, an optical amplifier, or an optical modulator.

In an embodiment which may be in accordance with any of the previous embodiments, at least one of the first and the second optical components comprises a waveguide of a photonic integrated circuit.

In an embodiment which may be in accordance with any of the previous embodiments, the first optical component and the second optical component comprise arrays of pluralities of transmitting and receiving facets, respectively; the coupler preform body comprises an array of a plurality of converging members; and the method comprises designing a plurality of coupling waveguides between the beam converging members and output facets on the transmitting side surface facing and being aligned with the receiving facets to transmit light received by the converging members to the receiving facets; and forming at least part of each of the designed coupling waveguides in the coupler preform body by direct laser writing.

In an embodiment in accordance with the previous embodiment, in the forming the designed waveguides in the coupler preform body, a laser beam is split into several sub-beams, and the plurality of designed waveguides are formed simultaneously by the sub-beams.

Further embodiments may be implemented in accordance with the claims.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in view of the accompanying drawings, wherein.

Figure 1:
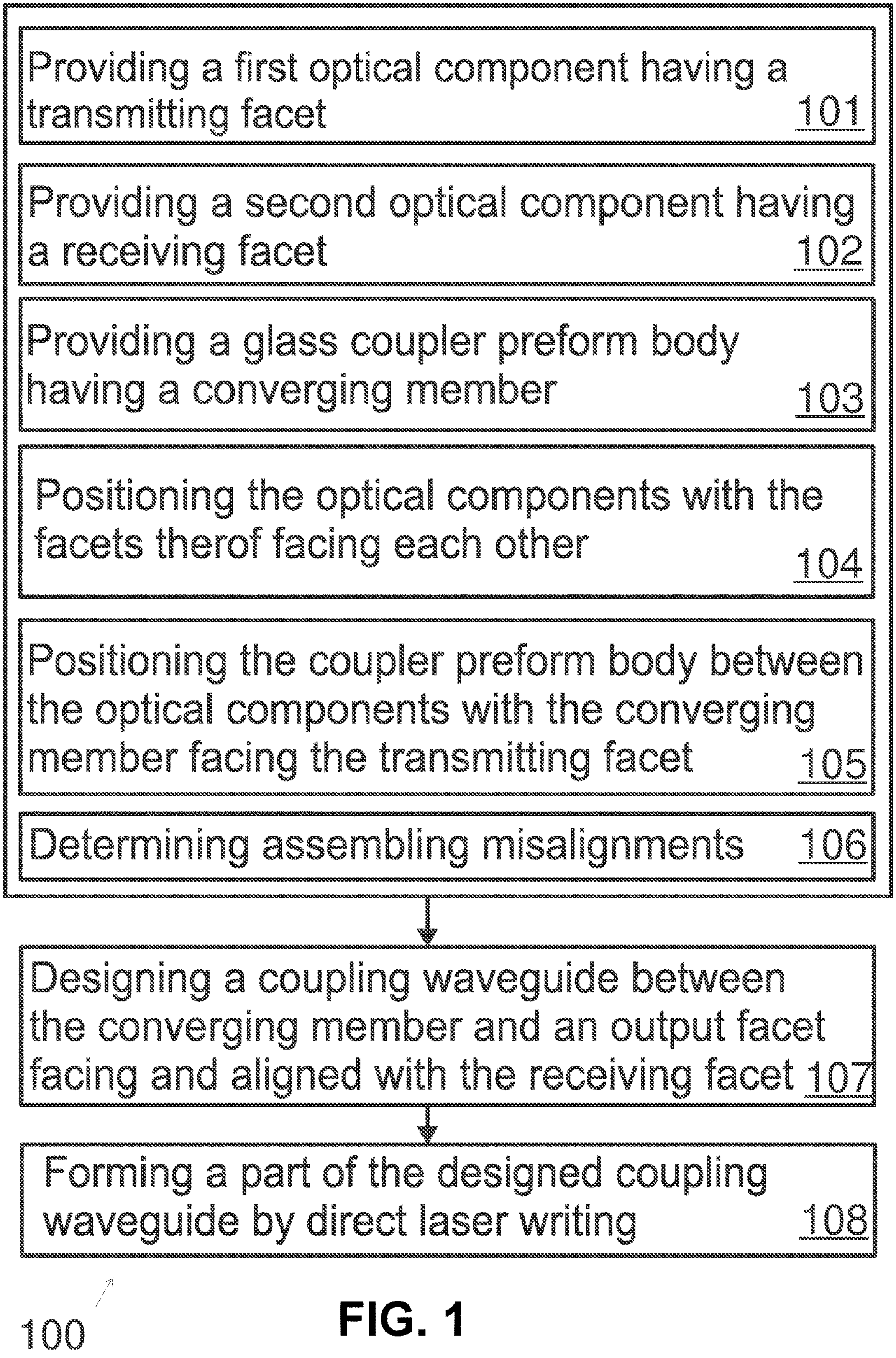
FIG. 1 shows a flow chart of a method for manufacturing an optical coupling arrangement.

The drawings of FIGS. 2A, 2B, 3, and 4 are schematic illustrations of three-dimensional entities. They are not drawn to scale.

DETAILED DESCRIPTION

The detailed description provided below in connection with the appended drawings is intended as a description of a number of embodiments and is not intended to represent the only forms in which the embodiments may be constructed, implemented, or utilized.

One or more of the embodiments specified above and/or hereinafter may advantageously provide a fast, simple, cost-efficient, and/or straightforward method for manufacturing an optical coupling arrangement. Advantageously, high-efficiency optical coupling between optical components may be formed by the method using passive alignment of the optical components. Especially advantageously, it may be possible to form the optical coupling in such a manner that different numerical apertures, different optical mode field properties, and/or different facet properties such as size and shape of the facets of the opposite optical elements are matched and/or the effect of misalignment(s) compensated.

"Optical coupling" between two optical components refers to the possibility of an optical signal passing, or being transmitted, between the two optical components. Thus, two optical components being optically coupled refers to an optical signal path being formed between the two optical components. Such optical signal path may comprise sections in various materials such as in solid optical material(s) and in the air.

An optical coupling arrangement may refer to the two optical components and possible one or more other components, parts, and/or elements being arranged in a specific positional and/or functional relationship to each other. An optical coupling arrangement may form at least part of an optical coupling assembly or an optical coupling device.

From a terminological point of view, such an optical coupling arrangement, assembly, or device may form an optical interconnection configured to optically interconnect the two optical components.

Numerical aperture matching may refer to the optical coupling arrangement being suitable for optically coupling two optical components with different numerical apertures, or other parameter(s) corresponding to numerical aperture(s), with limited optical losses caused by the numerical aperture difference.

Optical mode field matching may refer to the optical coupling arrangement being suitable for optically coupling two optical components with different optical mode field properties, such as a mode field shape or size, with limited optical losses caused by the optical mode field parameter difference(s).

An optical coupling arrangement or assembly may be used, for example, to form a part of an optical transceiver for optical data communication. In other embodiments, an optical coupling arrangement or assembly may be used in any other appropriate application or device, especially for optical data communication or transfer or optical sensing, where optical coupling or interconnection between two optical components is needed.

The example method of FIG. 1 for manufacturing an optical coupling arrangement comprises providing, in operations 101 and 102, a first and a second optical component.

The first and second optical components may be any appropriate optical components capable of transmitting and receiving light, respectively. One or both of them may comprise an optical component designed to form, or to be used in connection with, a photonic integrated circuit or an optical fiber.

The first optical component may comprise an active optical component or element such as a semiconductor laser, an optical amplifier, or an optical modulator.

The second optical component may comprise, for example, a photonic integrated circuit having an optical waveguide, or an optical fiber. Such optical waveguide or an optical fiber may be a part of, or be connected to, for example, an optical modulator, an optical detector, or any other appropriate type of optical component or element.

In an example embodiment where the method may provide certain advantages, the first optical component comprises a semiconductor laser and the second optical component comprises a waveguide of a photonic integrated circuit.

The first optical component has a transmitting facet.

A "facet" refers to a transmitting or receiving area on a surface for transmitting or receiving light, respectively. For example, in the case of a semiconductor laser, a transmitting facet may refer to the light emitting area on the laser outer surface. In the case of a waveguide or an optical fiber, a transmitting or receiving facet may refer to the transmitting or receiving area, respectively, at the end of the waveguide or the optical fiber.

The first optical component is configured to transmit a light beam out of the transmitting facet with a beam divergence which corresponds to a first numerical aperture.

The beam divergence may refer to a far field half angle of the edge of the light beam relative to the optical axis of the optical component or the beam axis of light beam transmitted by it. In the case of a gaussian light beam, the edge of the light beam may be defined as the point with an intensity of $1/e^2$ times the maximum intensity on the beam axis.

A light beam may have an asymmetric beam shape or mode field shape with different beam divergences in different directions perpendicular to each other. This may be the case, for example, with some active optical components such as semiconductor lasers or optical amplifiers. In the case of an asymmetric beam or mode shape, the beam divergence may be, for example, as high as 40 to 50 degrees in one direction such as a vertical or horizontal direction. In a perpendicular direction, such as a horizontal or vertical direction, respectively, the beam divergence may be, for example, as low as less than or equal to 10 to 15 degrees.

In the case of a light beam with different beam divergencies, the beam divergence discussed hereinafter may refer to the maximum beam divergence.

The second optical component has a receiving facet and is configured to receive light via the receiving facet with a second numerical aperture which may be smaller than the first numerical aperture.

As known for those skilled in the art, a numerical aperture NA may be defined as the sine of the maximum half angle $\theta_{max}$ of the acceptance of an optical component or element: $NA=n\cdot\sin\theta_{max}$, where n is the refractive index of the medium outside the optical component or element where the light propagates. Light incident on a receiving facet with a higher angle of incidence relative to the optical axis of the optical component or element cannot enter the optical component or element. Thereby, a numerical aperture of an optical component or element is related to and specifies a maximum angle of incidence of light that can enter an optical component or element, such as an optical waveguide or an optical fiber. Correspondingly, that same maximum angle of incidence may also be the maximum angle into which light can exit from such optical component or element.

A beam divergence "corresponding to" a specific numerical aperture refers to the beam divergence being the same as the maximum angle of incidence specified by the numerical aperture in question. Thus, the transmitted light beam with a beam divergence corresponding to the first numerical aperture higher than the second numerical aperture refers to the beam divergence angle exceeding the maximum angle of incidence with which light can enter the second optical component.

The first optical component such as a semiconductor laser being configured to transmit a light beam with a beam divergence corresponding to a first numerical aperture may refer to such component having the first numerical aperture.

In the case of the first optical component being, for example, a waveguide having a first numerical aperture, the beam divergence of the light beam transmitted out of the first optical component through the transmitting facet is in accordance with the first numerical aperture.

The difference between the first and the second numerical apertures means that optical losses would inevitably occur when directing the transmitted light beam from the first optical component directly to the second optical component.

The method further comprises providing, in operation 103, a coupler preform body.

"Preform" refers to that the coupler preform body is a preform of which a complete coupler or coupling element is to be formed in the method.

The provided coupler preform body is formed of a glass material. It has a receiving side surface and an opposite transmitting side surface, and a converging member. The converging member is configured to reduce, in accordance with converging characteristics, divergence of the light beam of the first optical component entering the glass preform body via the receiving side surface.

"Converging" refers in this specification to reducing divergence of light. A converging member may serve as a collimating member, "collimating" referring to the reduction of divergence. However, after converging, the light can still have some divergence. Respectively, after collimating, the light does not need to be completely collimated.

The receiving side surface may serve as, or be called, a "receiving face" of the coupler preform body. Respectively, the transmitting side surface may serve as, or be called, a "transmitting face" of the glass coupler preform body.

To be able to converge the light beam, the converging member may be arranged on, at, or in proximity of the receiving side surface.

The converging member being configured to reduce the divergence of the light beam may refer to the converging characteristics thereof being selected so as to be able to specifically reduce the divergence of the light beam of the first optical component. Thereby, a converging member with optimized converging characteristics may be used in the method.

The glass material may comprise any appropriate glass with sufficiently high optical transparency and sufficiently low optical losses for optical coupling arrangements for data communication. Also, sufficient thermal stability is advantageous for applications where optical interconnections are exposed to elevated temperatures. Possible glass materials include, for example, soda lime glass, silicate glass, silica glass, borosilicate glass, and silicon nitride.

"Providing" an element such as an optical component or a coupler preform body may refer to arranging, in any appropriate manner, such element to be available for further operations of the manufacturing method. For example, providing an element may comprise manufacturing such element. In other embodiments, ready manufactured or prefabricated element may be arranged available, at an assembly site of a production line, for further manufacturing operation(s).

Providing the optical components may be carried out at least partially automatically, using any appropriate automatic conveying and/or handling apparatuses and systems.

In operation 104, the first and second optical components are positioned with the transmitting and receiving facets thereof facing each other, mutually misaligned by an optical component misalignment.

In operation 105, the coupler preform body is positioned between the first and the second optical components such that the converging member and the transmitting facet face each other and are mutually misaligned by a preform misalignment.

The positioning of the first and the second optical components and the coupler preform body may be carried out by any appropriate handling and/or positioning apparatus or system, preferably at least partially automatically.

The three optical elements in the form of the first and the second optical components and the coupler preform body may be positioned so as to lie on any appropriate carrier or substrate. An optical element may be attached to such carrier or substrate, for example, by an adhesive or by some mechanical attaching or mounting means.

After the positioning of the first and the second optical components and the coupler preform body, the coupler preform body lies thus between the first and the second optical components.

In the example of FIG. 1, the first and the second optical components may be positioned first, and the coupler preform body may be positioned thereafter between the first and the second optical components.

In other embodiments, those three elements may be positioned in any appropriate order or at least partially simultaneously such that:

i. the coupler preform body lies between the first and the second optical components;
ii. the transmitting and receiving facets of the optical components face each other and are mutually misaligned by an optical component misalignment; and
iii. the converging member and the transmitting facet face each other and are mutually misaligned by a coupler misalignment.

A "mutual misalignment" refers to the mutual positioning of two elements deviating from a complete mutual alignment.

Mutual alignment may be determined by means of principal axes associated with the transmitting facets and receiving facets and the converging member. Depending on the type and operational principle of an optical component or element, a principal axis may refer to, or be formed by, an optical axis of the optical component or element.

In complete mutual alignment, the principal axes of two optical elements or components coincide such that they are parallel, i.e. identically oriented, and positioned on top of each other. Then, each of the two optical elements or components may be considered having its facet aligned with the facet of the other optical element or component.

In positioning the first and the second optical components and the coupler preform body, the objective may be a complete mutual alignment between the transmitting and receiving facets, and/or between the transmitting facet and the converging member. However, in practice, complete mutual alignment is not achievable, but some mutual misalignment always occurs after the positioning of two optical elements. It may result from the positioning inaccuracy of the positioning apparatus or system used for the positioning.

A translational misalignment occurs if the principal axes of two optical elements are parallel but there is an offset between them in a plane perpendicular to at least one of the principal axes.

An orientational misalignment occurs when the principal axes are not parallel, but there is a non-zero angle between them.

The mutual misalignment between the transmitting and receiving facets of the first and the second optical components, respectively, is named here "an optical component misalignment".

Correspondingly, the mutual misalignment between the transmitting facet and the converging member of the first optical component and the coupler preform body, respectively, is named here "a coupler misalignment". Each of those alignments may be called "an assembling misalignment" or "a misalignment".

In addition to losses caused by different numerical apertures of the two optical components (or the beam divergence and the second numerical aperture), also mutual misalignment(s) between the optical components may result in optical losses in comparison to a situation with complete mutual alignment.

Further optical losses may be caused, for example, due to mode field of the first optical component or the light beam incident on the transmitting facet having a size and/or shape differing from the size and/or shape, respectively, of the mode field of light propagating in the second optical elements.

Once the optical components and the coupler preform body have been positioned, both the optical component misalignment and the preform misalignment are determined in operation 106.

Said determination may be carried out, preferably at least partially automatically, by any appropriate manner and using any appropriate determination apparatus(es) and/or system(s). Such apparatus(es) and/or systems(s) may utilize machine vision. Said determination may comprise measuring any appropriate parameter(s) related to the misalignment. To facilitate the determination, any appropriate alignment or position markers may have been arranged in or on the optical components, the coupler preform body, and/or the carrier or substrate onto which those optical elements are positioned.

Once the misalignments are determined, a coupling waveguide is designed in operation 107 so as to extend between the converging member and an output facet on the transmitting side surface facing and being aligned with the receiving facet of the second optical component. The coupling waveguide is designed so as to transmit light received and at least partially converged by the converging member through the coupler preform body to the output facet and further out of the coupler preform body via the output facet.

Said designing may be carried out on the basis of any combination of one or more of the optical component misalignment, the coupler misalignment, the first and the second numerical apertures, and the converging characteristics of the converging member.

Being carried out "on the basis" such factor(s) refers to such factor(s) being taken into account in designing the coupling waveguide. Thereby, such factor(s) may have an effect on the properties of the designed coupling waveguide. Also other parameters and factors may be taken into account in the designing.

The designing may be carried out using any appropriate process(es) following the waveguide designing principles known in the art. In practice, designing may comprise calculations to find coupling waveguide parameters producing the desired effect of light transmission. Any appropriate optical simulation tool(s) or software(s) may be used to carry out the designing at least partially automatically. Such simulation may comprise setting some optimizing target such as maximal light transmission efficiency between the converging member and the output facet, and adjusting various parameters defining the waveguide to reach the optimizing target.

Determining the misalignments may comprise producing one more misalignment data sets, stored on a computer-readable media, comprising information of the determined misalignments. Respectively, designing the coupling waveguide may comprise producing one or more data sets, stored on a computer-readable media, comprising parameters defining the material properties, dimensions, and/or location in the coupler preform body, of the coupling waveguide.

The output facet of the coupler preform body may basically refer to a location on the output face onto which the coupling waveguide is designed to transmit the light received by the converging member. No specific structural features are necessary at that location to form the output facet.

The output facet being determined to be "aligned with" the receiving facet of the second optical component refers to zero mutual misalignment between those facets. Thereby, in the designed operation of the coupler preform body with the coupling waveguide, light propagating in the coupling waveguide and reaching the output facet may be transmitted out of the output facet to the receiving facet of the second optical component with high efficiency.

The coupling waveguide may be designed so as to narrow towards the output facet. This may be implemented by the coupling waveguide having one or more narrowing sections. In some embodiments, the entire coupling waveguide may narrow continuously. In some embodiments, there may be a non-narrowing end section with substantially continuous cross-sectional area.

"Narrowing" refers to a width, or cross-sectional area, of the coupling waveguide decreasing. Thereby, the coupling waveguide becomes, in its cross-section direction perpendicular to the longitudinal direction thereof, smaller. Narrowing "towards the output facet" refers to the coupling waveguide having at least one such position along its longitudinal direction, at which position the width or cross-sectional area thereof is smaller than the width or cross-sectional area at another position which lies closer to the input facet than the first mentioned position.

Narrowing of the coupling waveguide may be constant, i.e. occur with a constant rate such that the change of the width or cross-sectional area per a length unit remains the same. Alternatively, the narrowing may be changing, i.e. occur with different rates such that the change of the width or cross-sectional area per a length unit is different at different positions along the longitudinal direction of the waveguide. The changing may be continuous such that said rate changes continuously along the longitudinal direction.

On the other hand, the coupling waveguide may be designed so as to have at least one curved section. It may be advantageous that the designed coupling waveguide has at least one curved section which also narrows towards the output facet. Examples, operation of, and advantages of narrowed and curved coupling waveguides are discussed hereinafter with reference to FIGS. 2A, 2B, and 3.

In operation 108, at least part of the designed coupling waveguide is formed in the coupler preform body by direct laser writing.

Thereby, the formation of the designed coupling waveguide may be considered turning the initial coupling preform into a complete optical coupling element or an optical coupler.

Direct laser writing is a method basically known in the art to accurately and efficiently modify the optical properties, especially the refractive index, of a glass material. In the case of forming the designed coupling waveguide, laser writing may be used to make the refractive index of the volume of the designed coupling waveguide higher than that of the surrounding glass material.

In direct laser writing, a femtosecond laser and two-photon absorption may be utilized. A direct laser writing process may comprise, for example, a sequence of femtosecond laser pulses, performed in optical power range of 100-500 mW, followed by low-temperature cooling periods.

In forming the at least part of the coupling waveguide, the possible data set(s) comprising the parameters defining the coupling waveguide may be used to control the apparatus(es) used in the laser writing process.

Advantageously, when the coupling waveguide is designed on the basis of the realized misalignments and the designed waveguide is then formed in the coupler preform body, the efficiency of light transmission through the coupler preform body may be maximized without need for active alignment of the optical components and the coupler preform body. Passive alignment may shorten the manufacturing time and costs of the optical coupling arrangement.

"Active alignment" refers to positioning the optical components to be coupled while the optical components being operative, with at least one of them transmitting light, and actively adjusting the alignment on the basis of light signal passed through the coupling.

The designed coupling waveguide has a first end at the side of the receiving side surface of the first optical component, and a second end at the side of the transmitting side surface of the second optical component. The coupling waveguide may have a first or input facet at the first end and a second or output facet at the second end thereof. The coupling waveguide may be designed such that at least one of the first and the second ends lie at a separation distance from the transmitting or receiving side surface, respectively. Then, the designed coupling waveguide thus does not extend up to the receiving and/or transmitting side surface. The separation distance may be, for example, in the range of 2 to 20 μm. For example, it may be about 2, 5, 10, 15, 20, or 25 μm.

With an end of the coupling waveguide lying at a separation distance from the associated side surface of the coupler preform body, advantages may be achieved in avoiding adverse effects possibly occurring when carrying out direct laser writing up to an edge of the glass coupler preform body. Such effects might arise especially when the converging member is not an integral part of a single-material glass body of the coupler preform but a separate element mounted thereon. On the other hand, selecting the separation distance width properly may enable the separation distance having no significant adverse effect on the light transmission characteristics through the coupler preform body.

Advantageously, the method 100 of FIG. 1 may enable manufacturing a high efficiency optical coupling arrangement for coupling two optical components with different numerical apertures. This may be at least partially achievable by the use of the converging element of the coupler preform body. The coupler may thereby serve for matching the first and the second numerical apertures.

Some active optical components may have higher numerical apertures than passive optical components. For example, for an active optical component, the numerical aperture may be, for example, higher than or equal to 0.2. For some components, numerical apertures such as higher than or equal to 0.3 are possible. For a passive optical component, instead, the numerical aperture may be, for example, less than or equal to 0.1.

The method disclosed herein may provide specific advantages in embodiments where the first optical component is an active optical component with a high first numerical aperture, such as a semiconductor laser or an optical amplifier, and the second optical component is an optical component with a substantially lower second numerical aperture.

Yet further decrease in optical losses may be achievable by designing the coupling waveguide so that it matches at least partially also other properties of the first and the second optical components than the first and the second numerical apertures.

For example, the coupling waveguide may be designed to adjust a mode or beam shape of light propagating in the coupling waveguide. Thereby, the method may be used to manufacture an optical coupling arrangement or an optical coupler configured to match the mode or beam shapes of the first and the second optical components.

As another example of further functionalities of the optical coupling arrangement or optical coupler, the coupling waveguide may be designed to rotate polarization of light propagating therein. Thereby, the method may be used to manufacture an optical coupling arrangement or an optical coupler configured to match the polarization properties of the first and the second optical components.

In the above, the method is discussed with a focus on a single group of optical elements in the three components, i.e. the first and the second optical components and the coupler preform body. The operations discussed above may be multiplied and carried out simultaneously for a plurality of such groups of elements arranged in arrays. In such embodiments, the first optical component may comprise an array of transmitting facets, the second optical component may comprise an array of receiving facets, and the optical coupler preform body may comprise an array of converging members. The operations of determining the optical component and coupler misalignments and designing and as well as forming the coupling waveguide may be carried out at least partially simultaneously for all of the groups of elements. In the forming the designed coupling waveguides, a single laser beam may be split into a plurality of sub-beams, at least part of each single coupling waveguide being written by one of the sub-beams.

A converging member may comprise, for example, a lens, such as an elliptical lens, for example, an elliptical cylindrical lens. Such lens may form a local extension outwards of the receiving side surface.

"Elliptical" refers to a generally elliptical surface, covering also a spherical surface as a special case of ellipticity.

In other embodiments, a lens may be formed within the coupler preform body. Such lens may be formed in the operation of providing the coupler preform body by direct laser writing.

Examples of lenses serving as converging members are disclosed hereinafter with reference to FIGS. 2A, 2B, 3, and 4.

In the following, embodiments of the manufacturing method are discussed further with reference to optical coupling arrangements illustrated in FIGS. 2A, 2B, 3, and 4.

Figure 2A:
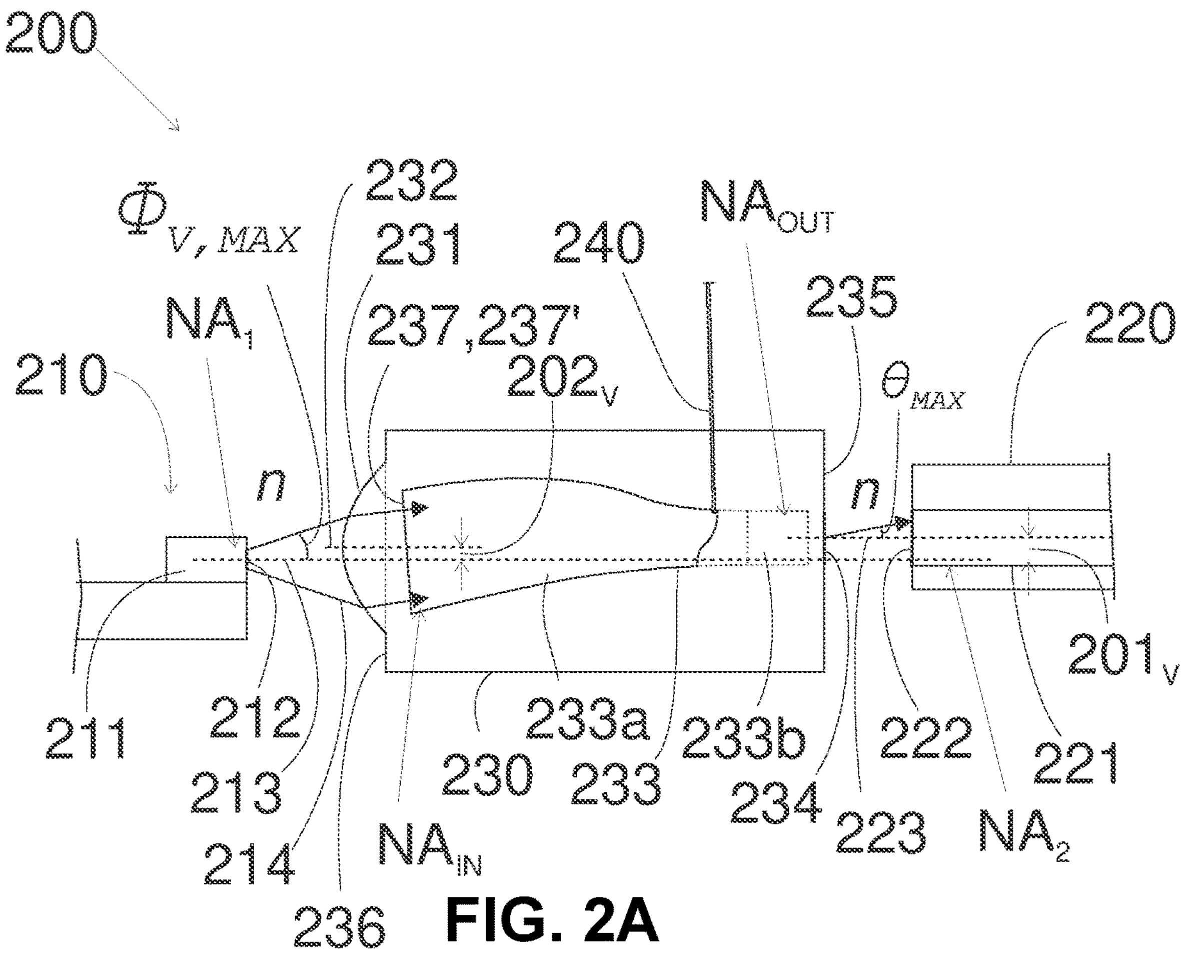
FIGS. 2A and 2B show a side view and a top view, respectively, of an optical coupling arrangement during its manufacture.

The optical coupling arrangement 200 FIG. 2A may be manufactured by any of the methods discussed above with reference to FIG. 1.

The optical coupling arrangement comprises a first optical component 210 comprising a semiconductor laser 211, a photonic integrated circuit 220 comprising an optical waveguide 221, serving as a second optical component, and an optical coupler preform body 230 made of a glass material.

Hereinafter, a photonic integrated circuit may be referred to as a "PIC".

Figure 2B:
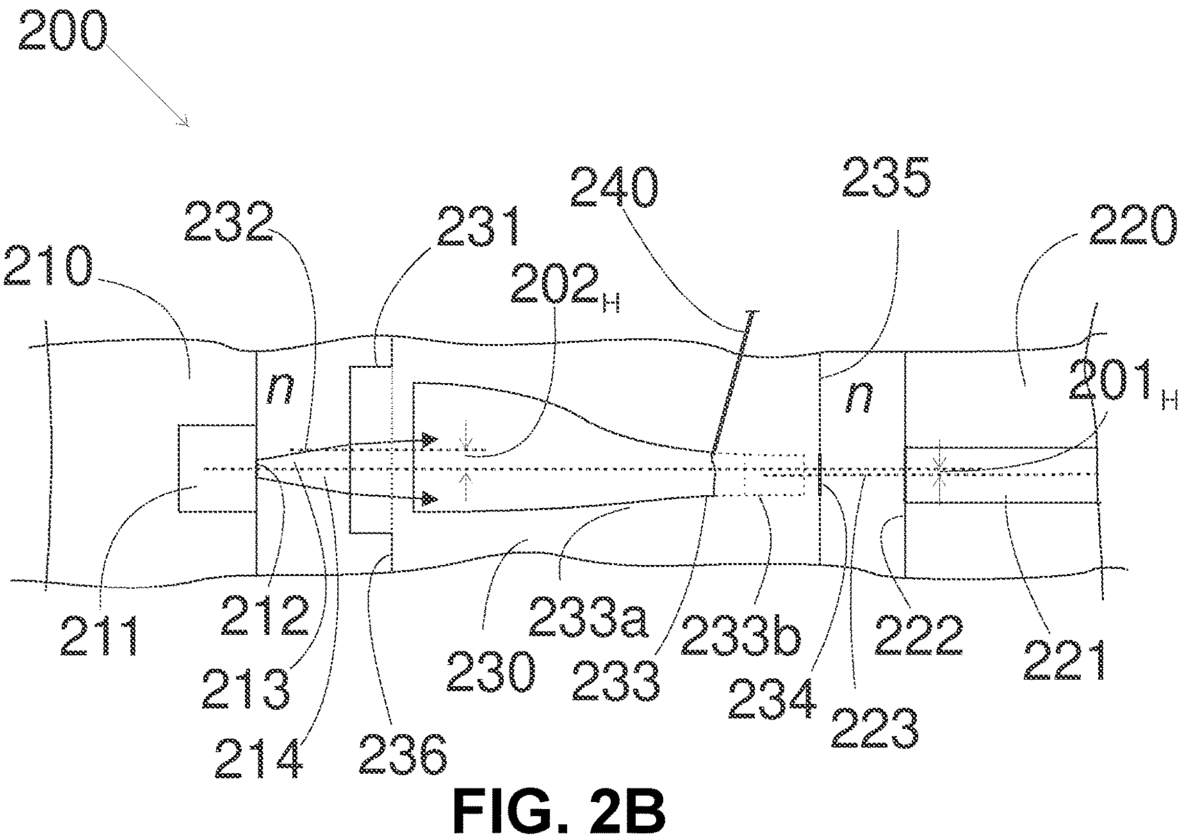

FIGS. 2A and 2B illustrate a stage of the manufacturing process where those three components have been previously positioned in accordance with predetermined mutual positionings. In those positionings, a transmitting facet 212 of the semiconductor laser 211 and a receiving facet 222 of the PIC 230 face each other, and an elliptical cylindrical lens 231 on a receiving side surface 236 of the coupler preform body 230 faces the transmitting facet 212. Thereafter, a coupling waveguide 233 between the elliptical cylindrical lens 231 and an output facet 234 at a transmitting side surface 235 of the coupler preform body 230 has been designed.

The coupler preform body 230 is a plate-form construction, the plate extending substantially along a fictitious base plane. Then, the side surfaces thereof may extend vertically relative to such base plane.

In the stage of the manufacturing process illustrated in FIGS. 2A and 2B, forming a part of the coupling waveguide 233 by direct laser writing is in progress. The volume of the designed coupling waveguide is being written in the glass coupler preform body by short pulses of a laser beam 240.

The predetermined mutual positionings may have been determined as the opposite optical elements facing each other with complete alignment. However, in practice, positioning accuracy may be incomplete, resulting in misalignments.

This is illustrated in FIG. 2A by offsets between the principal axes of the three components. A vertical offset between the optical axis 213 of the semiconductor laser 211 and the optical axis 223 of the optical waveguide 221 of the PIC 220 forms an optical component vertical misalignment $\mathbf{201}_V$. A vertical offset between the optical axis 232 of the cylindrical lens 231 and the optical axis 213 of the semiconductor laser 211 forms a coupler vertical misalignment $\mathbf{202}_V$.

In the side view drawing of FIG. 2A, only vertical misalignments are visible. Also horizontal misalignment(s) exist as illustrated in FIG. 2B. A horizontal offset between the optical axis 213 of the semiconductor laser 211 and the optical axis 223 of the optical waveguide 221 of the PIC 220 forms an optical component horizontal misalignment $\mathbf{201}_H$. A horizontal offset between the optical axis 232 of the cylindrical lens 231 and the optical axis 213 of the semiconductor laser 211 forms a coupler horizontal misalignment $\mathbf{202}_H$.

In general, a misalignment may be two dimensional, comprising an offset in two perpendicular directions such as horizontal and vertical.

In the example of FIGS. 2A and 2B, the misalignments comprise offsets of the principal axes only. In other embodiments, one or more misalignments may comprise, in addition to or instead of an offset, an orientational misalignment.

In the example of FIGS. 2A and 2B, the semiconductor laser 211 is an edge emitting laser. In other embodiments, for example, vertical cavity surface emitting lasers VCSELs may be used.

The semiconductor laser 211 is an example of an active optical element. In other embodiments, first optical components may comprise other types of active optical element such as optical amplifiers or optical modulators. In yet other embodiments, a first optical component may comprise a passive optical element such as a passive optical waveguide.

The semiconductor laser 211 and the waveguide 221 of the PIC 220 may be the only optical elements of the first and the second optical components of the optical coupling arrangement 200. Alternatively, they may represent single elements of an array or semiconductor lasers, and an array of waveguides, respectively.

The semiconductor laser 211 is configured to transmit, when in use, a light beam 214 marked by arrows in the drawings of FIGS. 2A and 2B. The light beam has a vertical beam divergence with a far field maximum half angle $\Phi_{V,MAX}$. The beam divergence thus corresponds to the maximum divergence of light output or transmitted from an optical element facet having a first numerical aperture $NA_1=n \cdot \text{Sin}\ \Phi_{V,MAX}$. Thereby, the beam divergence corresponds to such first numerical aperture.

The receiving facet 222 of the waveguide 221 of the PIC 220 has a second numerical aperture $NA_2$ defining a maximum half angle $\theta_{MAX}$ of light capable of entering the waveguide via an equation: $NA_2=n \cdot \text{Sin}\ \theta_{MAX}$.

The vertical maximum half angle $\Phi_{V,MAX}$ of the light beam 214 is larger than the maximum half angle $\theta_{MAX}$ of light capable of entering the waveguide 221. The second numerical aperture is thereby smaller than the first numerical aperture. Therefore, in the case of direct coupling between the semiconductor laser 211 and the waveguide 221, high optical losses could occur as only part of the light emitted or transmitted by the semiconductor laser 211 could enter the waveguide 221.

The elliptical cylindrical lens 231 may serve as a converging member for converging, with the optical coupling arrangement 200 in use, divergent light incident on the elliptical cylindrical lens 231. Thereby, with the optical coupling arrangement 200 in use, the elliptical cylindrical lens as a converging member may serve for matching the first and the second numerical apertures.

A converging member such as a lens, for example, the elliptical cylindrical lens 231, may be considered as a numerical aperture adjustment element serving for the numerical aperture matching.

The converging characteristics of the elliptical cylindrical lens 231 of FIG. 1 may have been selected for converging specifically the light beam 214 of the semiconductor laser 211.

In addition to serving for matching the numerical apertures, the elliptical cylindrical lens 231 may change the shape of the light beam 214 beam. This may be achieved by the elliptical cylindrical lens 231 converging the light beam in one direction only, namely, in the vertical direction. Semiconductor lasers may have an asymmetric beam or mode field shape with different beam divergencies in horizontal and vertical directions. Thereby, a converging member converging the beam or mode field shape in this direction may make the light beam or mode field shape more symmetric.

In the example of FIGS. 2A, and 2B, the semiconductor laser has its highest divergence in the vertical direction.

In other embodiments, an optical element such as a semiconductor laser may have an asymmetric beam or mode field shape with the highest divergence in the horizontal direction. Then, an elliptical cylindrical lens may be arranged on or in the coupler preform body in a position perpendicular to the position of the elliptical cylindrical lens 231 of FIGS. 2A and 2B.

The coupling waveguide 233 has at its first end, i.e. the end at the side of the receiving side surface 236 of the coupler body preform 230, an input numerical aperture NAIN. Due to the converging effect of the elliptical cylindrical lens 231, the input numerical aperture $NA_{IM}$ may be smaller than the first numerical aperture $NA_1$.

The coupling waveguide 233 is curved. As illustrated in the side and top view drawings of FIGS. 2A and 2B, there is curvature in both horizontal and vertical directions. Thereby there is a three-dimensional curvature. Then, observed in a cross-sectional plane on the coupler preform body, the locations of the ends of the coupling waveguide may differ both in the horizontal and vertical directions. Thereby, the coupling waveguide may be inclined. The coupling waveguide 233 also narrows towards the output facet 234.

Curved shape and/or narrowed configuration of coupling waveguide may affect the mode field or beam of light propagating therein in various aspects. For example, a curved configuration may be designed to compensate the optical component misalignment and/or the coupler misalignment. Thereby, efficient optical coupling between the first and the second optical components may be achieved.

The coupling waveguide 233 of FIG. 2 has a narrowing and curved beam adjusting section 233*a* followed by a non-narrowing straight waveguide section 233*b*. Non-narrowing refers to the straight waveguide section having substantially constant cross-sectional area or width. The properties of the beam adjusting section 233*a* may have been designed so as to gradually lower the numerical aperture of the coupling waveguide. Thereby, the numerical aperture matching between the first and the second optical components may be carried out partly by the converging member and the coupling waveguide.

The properties of the beam adjusting section 233*a* may have been designed so as to also adjust the size and/or shape of the mode field of the coupling waveguide so that the light entering the straight waveguide section 233*b* can be coupled efficiently to the optical waveguide 221 of the PIC 220. Then the coupling waveguide may have at its second end an output numerical aperture $NA_{OUT}$ smaller than or equal to the second numerical aperture $NA_2$, enabling efficient coupling of the light to the second optical component through the receiving facet.

The straight waveguide section 233*b* may be prefabricated so as to exist already in the initially provided glass coupler preform body. Then, only a part of the designed coupling waveguide, namely, the beam adjusting waveguide section 233*a* is formed by direct laser writing.

Curvature parameters of the coupling waveguide may have been chosen so as to provide adiabatic light propagation resulting in minimal losses via leakage of light out of the coupling waveguide.

As illustrated in FIG. 2A, the first facet 237' of the coupling waveguide at the first end 237 thereof is designed so as to be slightly tilted, i.e. lies at an angle, relative to the receiving side surface 236. Such non-parallel direction of the first or input facet may serve for compensating adverse effects caused by non-zero coupler misalignment. In other embodiments, a first or input facet may be parallel to the receiving side surface.

Figure 3:
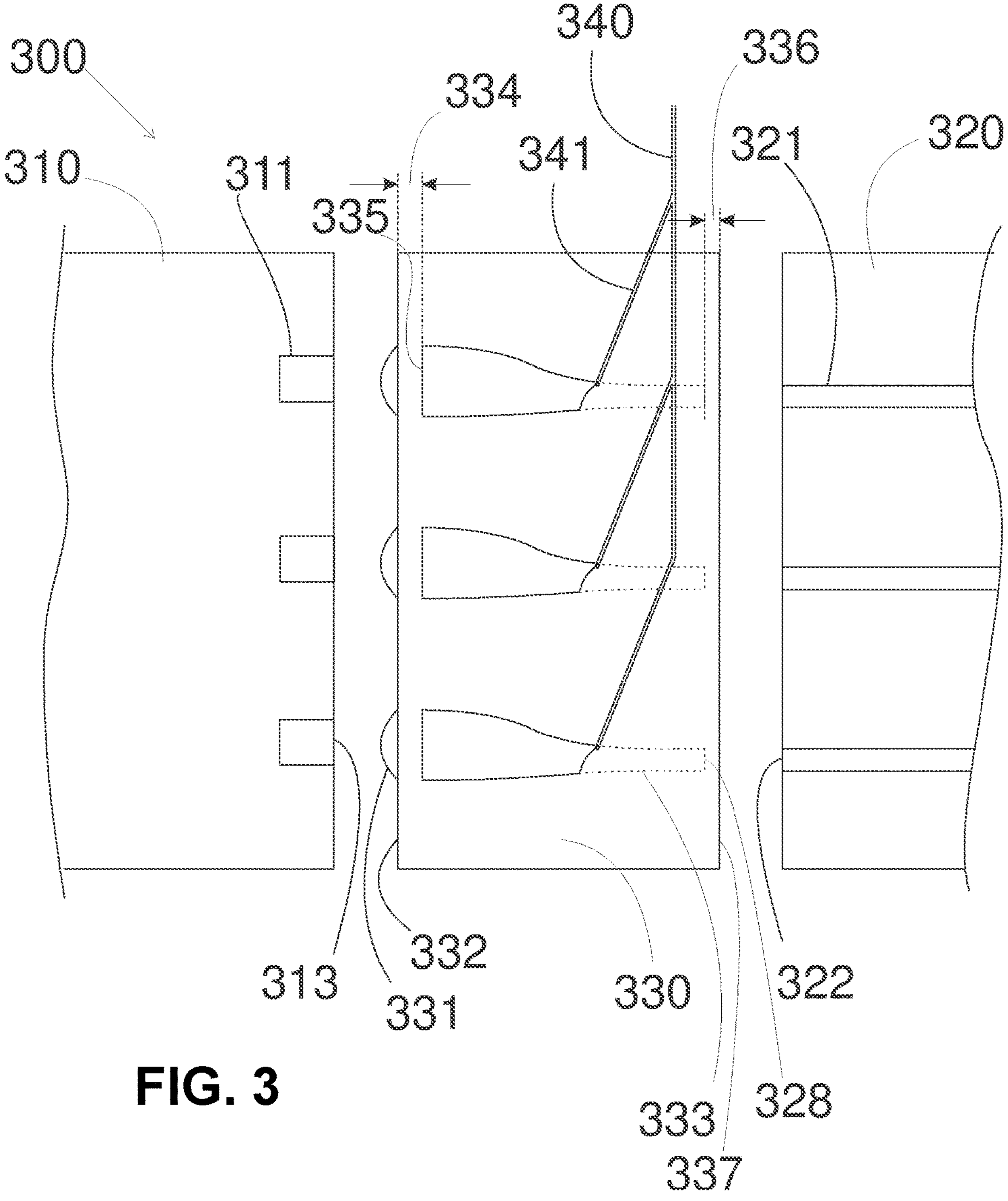
FIG. 3 shows a top view of another optical coupling arrangement during its manufacture.

The optical coupling arrangement 300 of FIG. 3 represents an array-based implementation of the method for manufacturing an optical coupling arrangement.

In the optical coupling arrangement 300, both the first optical component and the second optical component comprise an array of optical elements.

The first optical component 310 comprises an array of semiconductor lasers 311, from which light is output through a transmitting facet 313. The second optical component is a PIC 320 comprising an array of input waveguides 321 receiving light via receiving facets 322. The input waveguides may be optically coupled to further optical elements or components, for example, optical modulators, optical detectors, or optical amplifiers.

Correspondingly, the optical coupler preform body 330 has an array of converging members in the form of lenses 331 on its receiving side surface 332.

Light output from the semiconductor lasers 311 may in this example have a substantially symmetric mode field or beam. Then, differently from the elliptical cylindrical lens 231 of FIG. 2 example, the lenses 331 may have rotational symmetry. They may be, for example, rotationally symmetric elliptical lenses such as spherical lenses.

The semiconductor laser array, the second PIC, and the coupler preform body are positioned so that the semiconductor lasers 311, input waveguides 321, and lenses 331 form groups of three elements. For each semiconductor laser 311 with a transmitting facet 313, there is an opposite input waveguide 321 with a receiving facet 322 as well as a lens 331 facing the transmitting facet.

The distances between adjacent converging members are arranged to be equal to the distances between corresponding adjacent output facets 313 of the semiconductor lasers. In the example of FIG. 3, the distances between the semiconductor lasers and those between the input waveguides are identical. Then, also the lenses have been arranged onto the coupler preform body with the same distances therebetween.

The distances between adjacent elements in the arrays may be, for example, in the range of 100 to 2500 μm.

For each such group, the operations of the method up to the designing the coupling waveguide may have been carried out in accordance with any of the embodiments discussed above with reference to FIGS. 1 and 2.

The identical distances result in equal assembling misalignments in each group of elements. Then, also the designed coupling waveguides of different groups of elements may be mutually identical.

FIG. 3 illustrates the optical coupling arrangement in a stage of the manufacturing process where the forming of the coupling waveguides is in progress.

Differently from the manufacturing process illustrated in FIGS. 2A and 2B, in said forming, one single laser writing beam 340 is split into a plurality of sub-beams 341, each writing one coupling waveguide. As the designed waveguides are identical, the movements of all the sub-beams may be controlled identically.

Thereby, an array of coupling waveguides 333 may be formed in the coupling preform body in an efficient and accurate manner.

In splitting the writing laser beam and moving the sb-beams, any appropriate arrangements and systems comprising optical, mechanical, and/or electrical components or devices may be used.

The lenses of the examples of FIGS. 2A, 2B, and 3 have one continuous surface section as a refractive interface of the lens. In other embodiments, flat lens configuration may be used where, instead of one single elliptical surface section, the lens has a plurality of elliptical surface sections connected via connecting surface sections extending substantially parallel to the optical axis of the flat lens. The principle is known from Fresnel type lenses. Such flat lens configuration can me made thin, which may enable the coupler preform body to be positioned close to the first optical component.

The lens types discussed above with reference to FIGS. 1, 2A, 2B, and 3 are examples of converging members forming local extensions of the coupler preform body out of the receiving side surface thereof. Such lenses may be incorporated in a coupler preform body as separate elements mounted on an initially flat receiving side surface. Such mounting may be done, for example, by glass bonding or by using an optically clear adhesive. In other embodiments, a converging member such as a lens may be an integral part of the coupler preform body without any material interface between the converging member and the rest of the glass body. For example, a coupler preform may be molded as directly having the outwards extending converging members thereon. Those two alternatives are illustrated in FIGS. 2A, 2B and 3 by the receiving side surface 236 at the location of the converging member 232 being marked by a dashed line.

In the examples of FIGS. 2A, 2B and 3, the coupling waveguides have their ends separated from the receiving side surfaces and the transmitting side surfaces by separation distances. As marked in FIG. 3, a first separation distance 334 exists between the receiving side surface 332 of the coupler preform body 330 and first ends 335 of the coupling waveguides 333 at the side of the receiving side surface. A second separation distance 336 exists between the transmitting side surface 337 of the coupler preform body 330 and second ends 338 of the coupling waveguides 333 at the side of the transmitting side surface. The dimensions and effects of the separation distances are discussed above with reference to FIG. 1.

Figure 4:
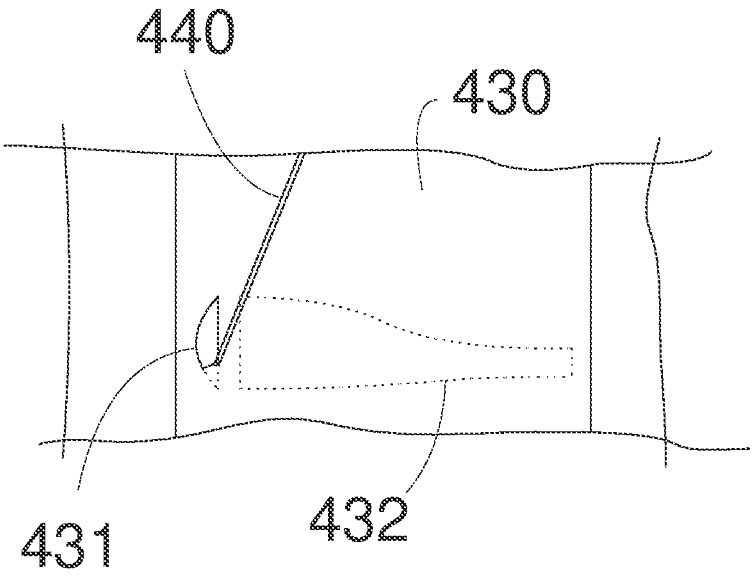
FIG. 4 shows details of a coupler preform body of an optical coupling arrangements during its manufacturing.

FIG. 4 illustrates a different lens configuration where an integral lens 431 is formed within the coupler preform body 430. The integral lens 431 forms within the glass coupler preform body a volume having a refractive index higher than that of the surrounding material.

FIG. 4 illustrates the integral lens in a stage of the manufacturing process where the operation of providing a coupler preform body having a converging member is in progress. The integral lens is being formed by direct laser writing using a laser beam 440. This may advantageously enable efficient use of the same laser for both forming the converging member(s) and the coupling waveguide(s) 432.

The lenses discussed above with reference to FIGS. 1, 2A, 2B, 3, and 4 are refractive lenses. In other embodiments, a coupler preform body or a completed coupler or a coupling element with diffractive lens(es) as converging member(s) may be used.

It will be understood that the benefits and advantages described above may relate to one embodiment or example or may relate to several embodiments or examples. The embodiments and examples are not limited to those that solve any or all of the stated problems or those that have any or all of the stated benefits and advantages. It will further be understood that reference to 'an' item refers to one or more of those items.

Wherever in this specification a device, component, element, member, or another entity is specified being "configured to" "for" a specific operation, such entity may be considered being "for" carrying out that operation.

The term "comprising" is used in this specification to mean including the feature(s) followed thereafter, without excluding the presence of one or more additional features.

The invention claimed is:

1. A method for manufacturing an optical coupling arrangement, the method comprising:

providing a first optical component having a transmitting facet, configured to transmit a light beam with a beam divergence corresponding to a first numerical aperture out of the transmitting facet;

providing a second optical component with a second numerical aperture, having a receiving facet, configured to receive light via the receiving facet;

providing a glass coupler preform body having a receiving side surface and an opposite transmitting side surface, and comprising a converging member configured to reduce, in accordance with converging characteristics, the beam divergence of the light beam entering the glass coupler preform body via the receiving side surface;

positioning the first and second optical components with the transmitting and receiving facets facing each other mutually misaligned by an optical component misalignment;

positioning the coupler preform body between the first and the second optical components with the converging member and the transmitting facet facing each other mutually misaligned by a preform misalignment;

determining the optical component and preform misalignments;

designing, on the basis of the determined misalignments, the first and the second numerical aperture, and/or the converging characteristics, a coupling waveguide between the converging member and an output facet on the transmitting side surface facing and being aligned with the receiving facet; and forming at least part of the designed coupling waveguide in the coupler preform body by direct laser writing.

2. A method as defined in claim 1, wherein the second numerical aperture is smaller than the first numerical aperture.

3. A method as defined in claim 1, wherein the coupling waveguide is designed so as to have an input numerical aperture smaller than the first numerical aperture.

4. A method as defined in claim 1, wherein the coupling waveguide is designed so as to have an output numerical aperture smaller than or equal to the second numerical aperture.

5. A method as defined in claim 1, wherein the converging member comprises a lens.

6. A method as defined in claim 5, wherein the lens comprises an elliptical cylindrical lens.

7. A method as defined in claim 1, wherein the converging member forms a local extension outwards of the receiving side surface.

8. A method as defined in claim 1, wherein the converging member is formed within the coupler preform body.

9. A method as defined in claim 8, wherein the providing the coupler preform body comprises forming the converging member in the coupler preform body by direct laser writing.

10. A method as defined in claim 1, wherein the first numerical aperture is at least 0.2.

11. A method as defined in claim 1, wherein the coupling waveguide is designed so as to narrow towards the output facet.

12. A method as defined in claim 1, wherein the coupling waveguide is designed so as to have at least one curved section.

13. A method as defined in claim 1, wherein the coupling waveguide is designed so as to have at least one curved section narrowing towards the output facet.

14. A method as defined in claim 1, wherein the coupler preform body is provided so as to comprise a prefabricated waveguide section, and the coupling waveguide is designed so as to comprise the prefabricated waveguide section.

15. A method as defined in claim 1, wherein the coupling waveguide is designed so as to have a first end at the side of the receiving side surface and a second end at the side of the transmitting side surface, at least one of the first and the second ends lying at a separation distance from the transmitting or receiving side surface, respectively.

16. A method as defined in claim 15, wherein the separation distance lies in the range of 2 to 25 μm.

17. A method as defined in claim 1, wherein the first optical component comprises an active optical component, the active optical component being one of a semiconductor laser, an optical amplifier, or an optical modulator.

18. A method as defined in claim 1, wherein at least one of the first and the second optical components comprises a waveguide of a photonic integrated circuit.

19. A method as defined in claim 1, wherein the first optical component and the second optical component comprise arrays of pluralities of transmitting and receiving facets, respectively;

the coupler preform body comprises an array of a plurality of converging members; and the method comprises designing a plurality of coupling waveguides between the beam converging members and output facets on the transmitting side surface facing and being aligned with the receiving facets to transmit light received by the converging members to the receiving facets; and forming at least part of each of the designed coupling waveguides in the coupler preform body by direct laser writing.

20. A method as defined in claim 19, wherein in the forming the designed waveguides in the coupler preform, a laser beam is split into several sub-beams, and the plurality of designed waveguides are formed simultaneously by the sub-beams.

* * * * *